March 10, 1953     I. F. KING     2,631,112

CREAM CAN EMPTYING METHOD

Filed Nov. 18, 1946

INVENTOR.
Iliff F. King
BY R. D. Story
ATTORNEY

Patented Mar. 10, 1953

2,631,112

UNITED STATES PATENT OFFICE 2,631,112

CREAM CAN EMPTYING METHOD

Iliff F. King, Mount Pleasant, Iowa, assignor, by mesne assignments, to Swift & Company, a corporation of Illinois Application November 18, 1946, Serial No. 710,597

3 Claims. (Cl. 134—5)

This invention relates to a method for emptying cream cans and more particularly to an improved method of facilitating the removal of chilled cream from the usual commercial cream can.

It is a further object of this invention to provide a method of emptying cream from a can with less loss of cream than is now conventional.

It is another object of this invention to provide an improved method for more quickly and completely emptying cream from a can.

Other objects will appear from the specification below. In the drawings.

Figure 1:
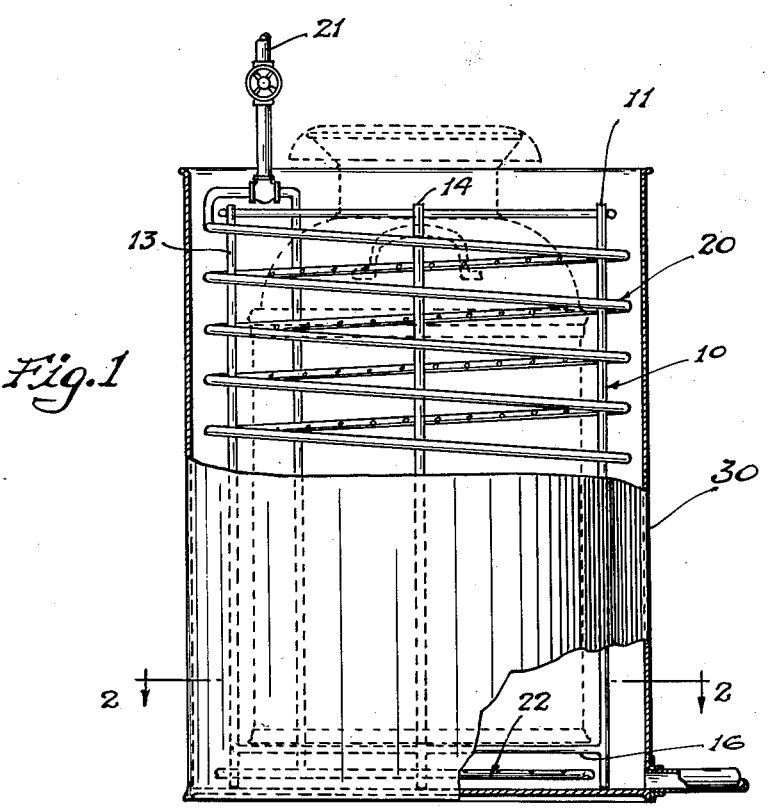
Figure 1 represents a side view, partly broken away, of a preferred form of the apparatus adapted to perform this invention.
Figure 2:
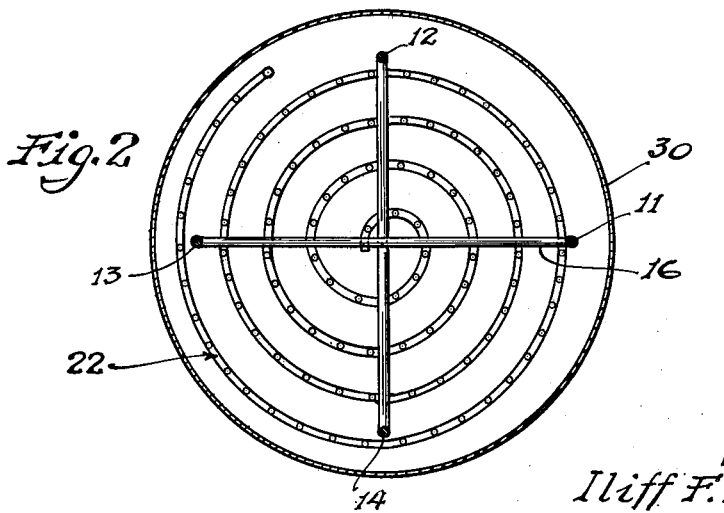
Figure 2 is a sectional view, taken on line 2—2 of Figure 1.

In following the usual practice, as cream is delivered from the farms to the collecting stations located throughout the farming areas, the bulk of the cream is dumped from the cream can and then the remainder of the cream which clings to the walls of the can is removed from the can by various means. Sometimes water or steam is flushed into the can to loosen and dilute the cream adhering to the walls whereby it is washed free of the can. At some stations, where labor is plentiful, squeegee scraping devices are used to wipe the walls of the can down.

This invention provides an improvement on all known means for removing cream from cans, and has particular application for the removal of relatively stiff chilled cream from the can. The device basically takes the form of heating means to warm the walls of the cream can to such an extent that the cream layer next adjacent to the inside of the wall of the can is warmed up so that the fatty material present in the cream is partially melted. The heating is done quickly so that the walls of the container are heated through and the outer layer of cream fat is melted without, however, appreciably heating the mass of cream contained in the can.

After the can has been heated for a sufficient time to melt the layer of fat on the outside of the cream, the can is quickly inverted and the entire mass of cream separates from the can and slides out of its mouth. The separation, as between the can and the cream, is most efficient and as the walls of the can are somewhat warm any chilled cream coming in contact therewith is immediately warmed so that it slides quickly out of the mouth of the container. In this manner the cream is removed from the container so rapidly and efficiently that all necessity for further washing or scraping is eliminated. Thus, substantially the entire bulk of cream in the can is delivered at its full concentration, and no fraction is diluted with wash water and collected as has sometimes been the practice in the past. The cans, after being emptied as here taught, are then ready for a quick rinsing and return to the farm.

Referring more particularly to the drawings, a preferred form of an apparatus for performing this invention is shown. In this device, a basket or rack 10 is provided to receive a cream can which is represented by its dotted outline. The rack may take the form of four upright posts 11, 12, 13 and 14, from which a floor 16 is supported to receive the cream can. The upright ends of the vertical rods may be flared outwardly if desired in order to guide the can into proper position in the rack.

Surrounding the upper end of the rack is a coil of pipe 20 which may be, and preferably is formed of copper or some other non-corrosive metal. The coil 20 is connected to a hot water or steam supply 21, and a hot fluid is continuously delivered into the coil. The coil is provided with a plurality of openings to direct the fluid flowing therein against the surface of the cream can held in the rack, and the hot water or steam serves to thoroughly warm the metal of the container so that heat may be transferred to the cream. The heat is supplied so rapidly that the cream in the can has the fatty material at its surface substantially melted so that it will quickly slide away from the inside surface of the container. It is essential that the heat be supplied rapidly so that only the outer layer of cream is warmed to melt the fatty material while the bulk of the cream is not appreciably warmed.

Also connected to the steam or water supply 21 is a spiral coil 22 positioned under the floor 16 of the rack and having apertures therein to direct the heating fluid against the under surface of the cream can. This frees the cream from the bottom of the can and as the hot water from coil 20 flows down the outside of the can, the bottom is warmed by the fluid sprayed up from coil 22. It is obvious of course that if saturated steam is sprayed out of coil 20 it will condense on the cold surface of the can and the resulting hot water will flow down the outside to transmit the desired heat to the surface of the body of cream in the can.

Surrounding the rack and spray coil is a suitable casing 30 to confine the spray. The casing 30 has a suitable drain provided at its lower end so that the spray fluid may be removed from the bottom of the casing as rapidly as it collects on the floor of the casing.

It has been found most satisfactory to use hot water having a temperature of around 150° F. for showering the outside of the cream can. This is the temperature usually used for pasteurizing cream and thus the fatty layer may be melted without fear of scorching any of the cream in the can. When water is used in large volumes, it serves the additional function of thoroughly flushing the outside of the cream can so that any loose dirt particles adhering to the outside of the can are quickly washed clear. For this purpose the coil 20 is positioned with respect to the can such that the water spraying from the coil engages the can adjacent its neck and flows downwardly from the neck portion of the can to heat substantially its entire wall area.

It has been found that this device has particular utility in emptying cans filled with cream that has been thoroughly chilled, as in the wintertime. The cold cream has a rather thick jelly consistency and when the filled cream can is heated in this manner the mere outer layer of cream is melted and the mass tends to fall out as a unitary blob. The outer surface of melted fat seems to grease the ways and a quick and most efficient manner for emptying the can is thus provided.

In using the apparatus the cream, as received at the cream station, is placed in the apparatus. The surface of the cream can is thoroughly rinsed with the spray of hot fluid from the shower pipes prior to the emptying of the can and simultaneously with the spray washing, the very outermost layer of fatty material of the cream is substantially softened. After the cream can has been washed for a period of about two minutes, the period of course depending upon the temperature of the flushing fluid and the temperature of the cream contained in the can, the can is removed from the washing and heating apparatus. The cap is then quickly removed and the can is upended so that the cream is removed as quickly as possible after the can is withdrawn from the rack 10. The cream is collected in any suitable means, and the can is ready for a quick rinse to remove the very thin film or residue remaining in the can.

While the above describes the preferred form of apparatus and method for emptying cream from a can, it is obvious that many modifications may occur to those skilled in the art, all of which are contemplated to fall within the scope of the following claims.

I claim:

1. The method of preparing a cream can filled with relatively stiff cream for dumping, including the steps of simultaneously spraying substantially the whole of the exterior of the can with a fluid having a temperature sufficiently high to cause a rapid heating of the walls of the container, continuing the heating for a time period sufficient to melt the fatty substances in only the layer of cream next adjacent to the wall of the container whereby substantially the entire mass of the cream will pour from the container as a relatively unitary blob without contamination from the exterior portions of the cream can, and immediately pouring substantially the entire mass of the cream from the can.

2. The method of dumping closed cream cans filled with relatively stiff cream, including the steps of simultaneously spraying substantially the whole of the exterior of the can with a fluid having a temperature sufficiently high to cause a rapid heating of the walls of the container, continuing the heating for a time period sufficient to melt the fatty substances in only the layer of cream next adjacent to the wall of the container, removing the lid of the can, and immediately pouring substantially the entire mass of the cream from the container as a relatively unitary blob.

3. The method of preparing a cream can filled with relatively stiff cream for dumping, including the steps of simultaneously spray washing substantially the whole of the exterior of the can with a liquid having a temperature of about 150° F., continuing the heating for a time period sufficient to melt the fatty substances in only the layer of cream next adjacent to the wall of the container, and immediately pouring substantially the entire mass of the cream from the container.

ILIFF F. KING.

REFERENCES CITED

The following references are of record in the file of this patent:

UNITED STATES PATENTS

| Number | Name | Date |
|---|---|---|
| 1,278,562 | Ault | Sept. 10, 1918 |
| 1,477,068 | Magann | Dec. 11, 1923 |
| 1,485,159 | Bartholomew | Feb. 26, 1924 |
| 1,661,602 | Dary | Mar. 6, 1928 |
| 1,797,430 | Logan | Mar. 24, 1931 |
| 1,899,495 | Celaya | Feb. 28, 1933 |
| 1,963,217 | Van Horn | June 19, 1934 |
| 2,011,107 | Lape | Aug. 13, 1935 |
| 2,088,658 | Meyerson | Aug. 3, 1937 |
| 2,105,767 | Gettelman | Jan. 18, 1938 |
| 2,432,584 | Paulson | Dec. 16, 1947 |